(12) United States Patent
Hung

(10) Patent No.: US 9,335,498 B2
(45) Date of Patent: May 10, 2016

(54) OPTICAL DEVICE

(71) Applicant: HON HAI PRECISION INDUSTRY CO., LTD., New Taipei (TW)

(72) Inventor: Yi Hung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 107 days.

(21) Appl. No.: 14/083,462

(22) Filed: Nov. 19, 2013

(65) Prior Publication Data

US 2015/0117814 A1 Apr. 30, 2015

(30) Foreign Application Priority Data

Oct. 25, 2013 (TW) .............................. 102138788 A

(51) Int. Cl.
*G02B 6/32* (2006.01)
*G02B 6/42* (2006.01)

(52) U.S. Cl.
CPC ............ *G02B 6/4214* (2013.01); *G02B 6/4249* (2013.01); *G02B 6/32* (2013.01)

(58) Field of Classification Search
USPC .......................................................... 385/33
See application file for complete search history.

(56) References Cited

U.S. PATENT DOCUMENTS

| 2004/0202477 | A1* | 10/2004 | Nagasaka et al. | 398/138 |
| 2009/0097128 | A1* | 4/2009 | Yokoyama | G02B 25/001 359/645 |
| 2014/0169736 | A1* | 6/2014 | Hung | 385/33 |
| 2015/0062565 | A1* | 3/2015 | Hung | G01M 11/0221 356/124 |
| 2015/0063749 | A1* | 3/2015 | Hung | G02B 5/04 385/33 |

* cited by examiner

*Primary Examiner* — Eric Wong
(74) *Attorney, Agent, or Firm* — Novak Druce Connolly Bove + Quigg LLP

(57) ABSTRACT

An optical device includes a light emitting element emitting light signal, a light coupling lens and a light receiving element. The light coupling lens includes a light input surface, a light output surface adjacent to the light input surface and a plurality of total reflective surfaces connected to the light input surface and the light output surface. The light input surface includes a first aspheric protrusion facing the light emitting element. The light output surface includes a second aspheric protrusion. Light signal emitted from the light emitting element enters the light coupling lens and collimated by the first aspheric protrusion to be parallel light signal. The parallel light signal is reflected by the total reflective surface and then collimated by the second aspheric protrusion to be convergent light signal. The light receiving element receives the convergent light signal.

12 Claims, 3 Drawing Sheets

OPTICAL DEVICE

BACKGROUND

1. Technical Field

The disclosure relates to an optical device.

2. Description of Related Art

Optical device, such as optical signal processor, generally includes a circuit board, a light emitting element and a fiber acting as a light receiving element. The light emitting element is arranged on the circuit board. A light signal emitted from the light emitting element travels in straight line into the light receiving element therefore, the light receiving element is required to be directly front the light emitting element. However, such position relation between the light receiving element and the light emitting element limits wider use of the optical device.

Therefore, what is needed is an optical device which can overcome the described limitations.

BRIEF DESCRIPTION OF THE DRAWINGS

Many aspects of the disclosure can be better understood with reference to the following drawing. The components in the drawing are not necessarily drawn to scale, the emphasis instead being placed upon clearly illustrating the principles of the present optical device for microminiaturization. Moreover, in the drawing, like reference numerals designate corresponding parts throughout the whole view.

DETAILED DESCRIPTION OF EMBODIMENTS

Figure 1:
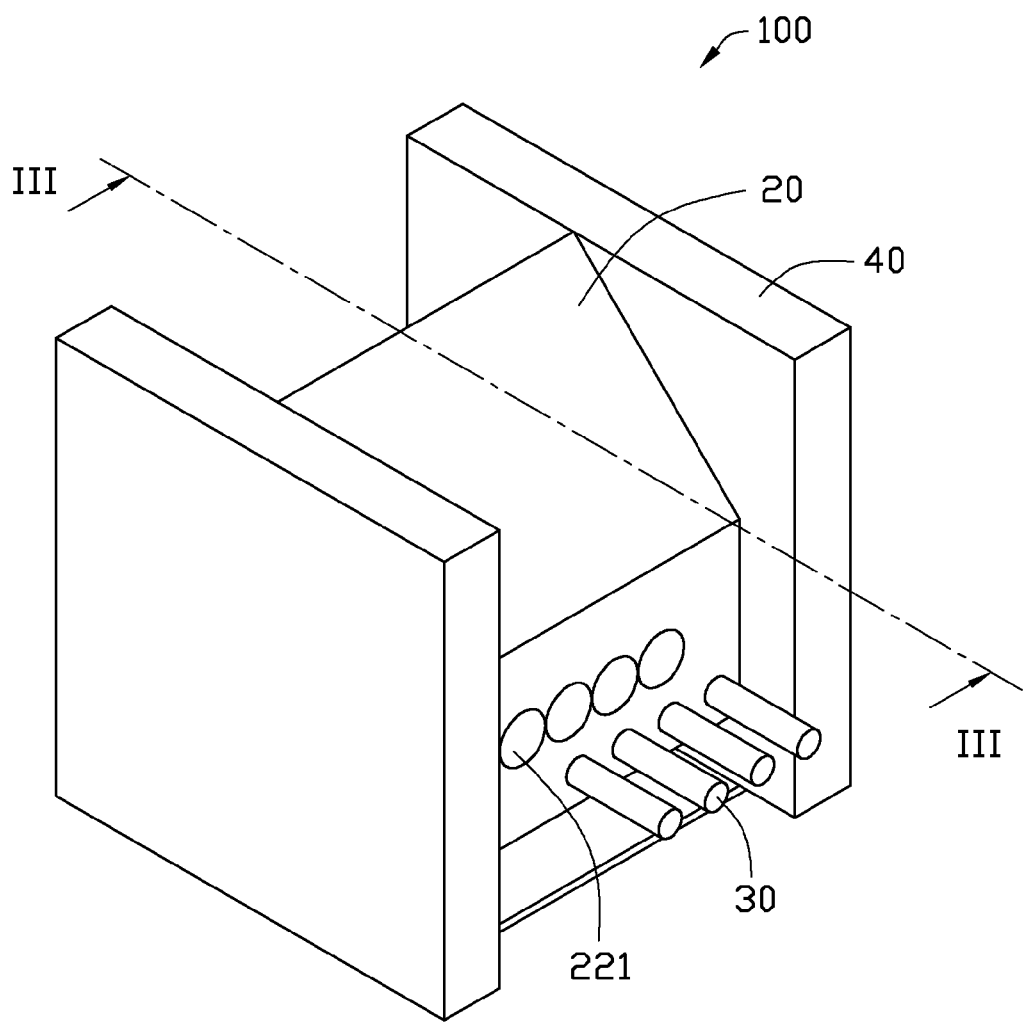
FIG. 1 is a schematic, isometric view of an optical device, in accordance with an exemplary embodiment of the present disclosure.
Figure 2:
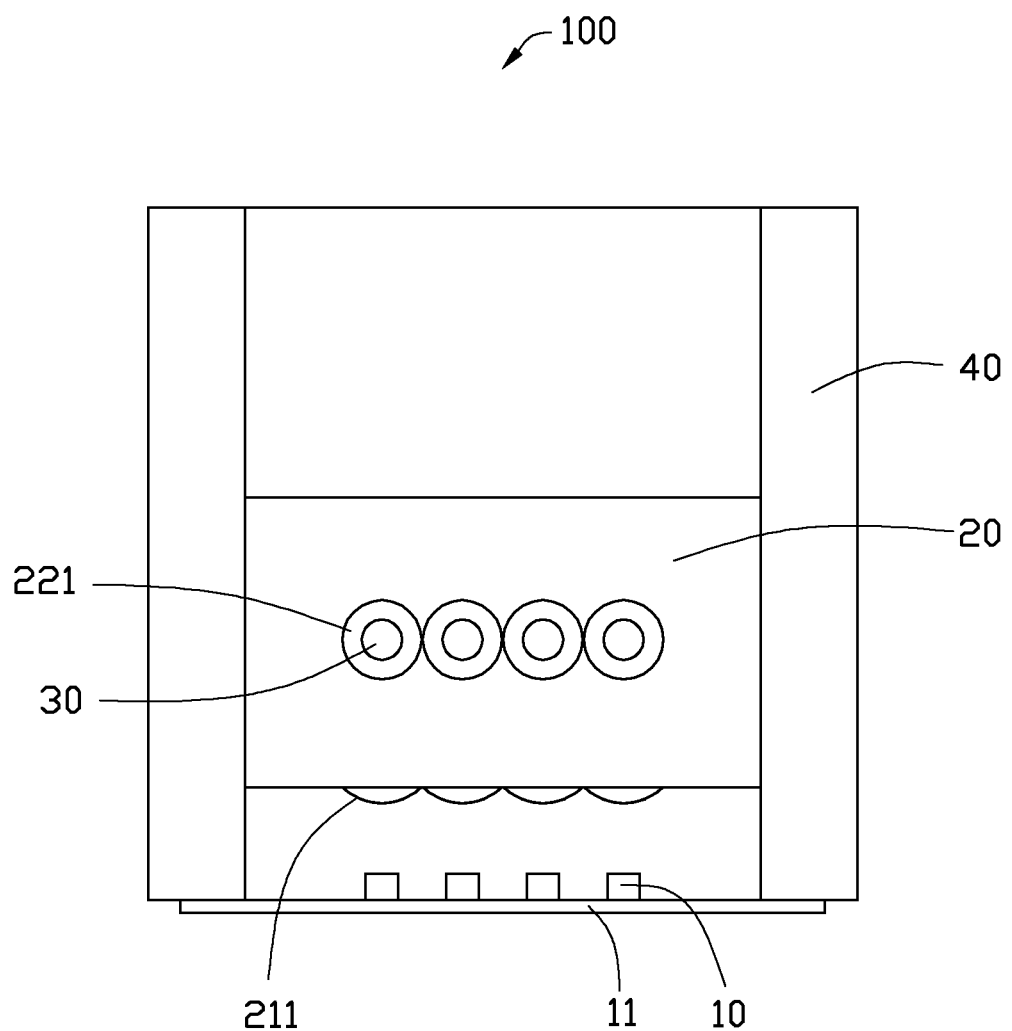
FIG. 2 is a front view of the optical device of FIG. 1.
Figure 3:
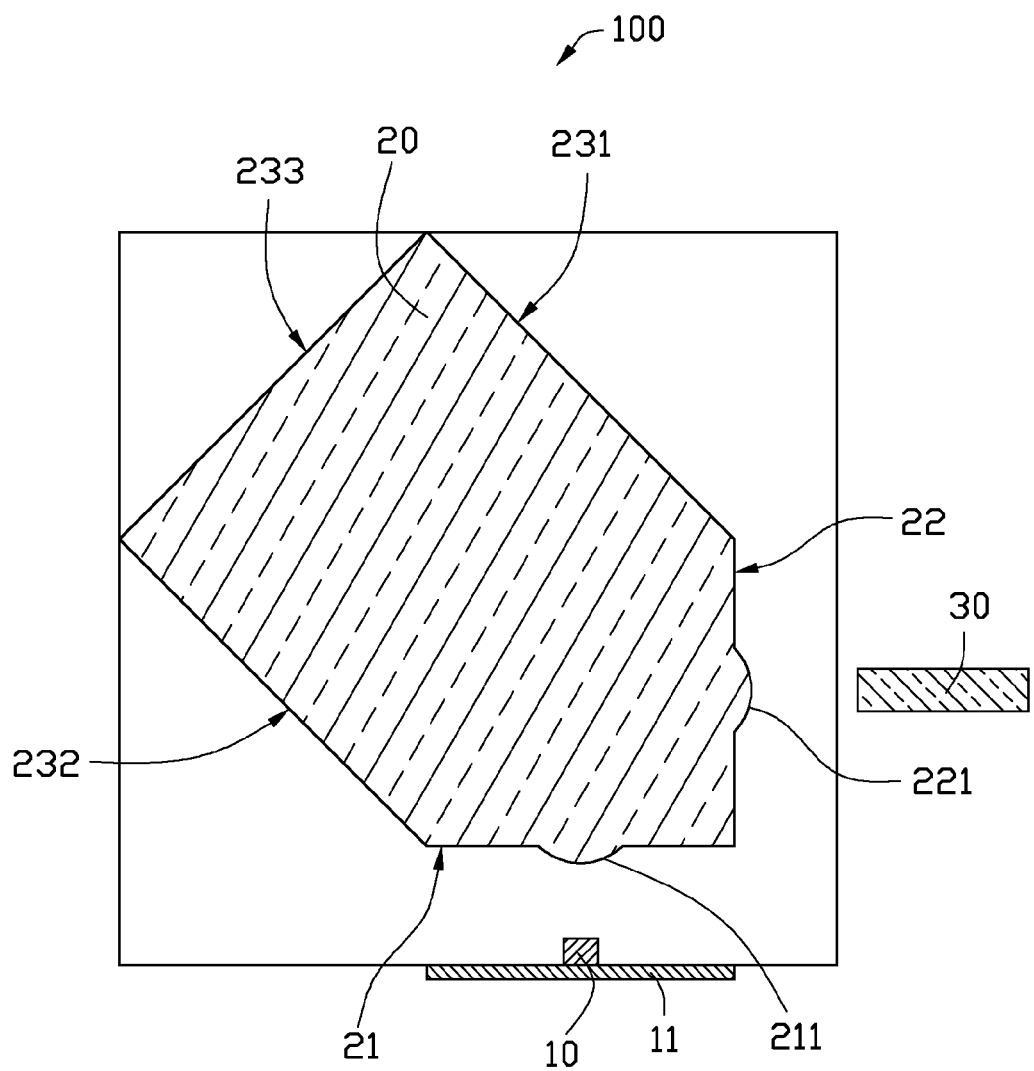
FIG. 3 is a cross-sectional view of the optical device of FIG. 1, taken along line III-III thereof.

Referring to FIGS. 1 to 3, an optical device 100 in accordance with an exemplary embodiment of the present disclosure is illustrated. The optical device 100 includes a plurality of light emitting elements 10, a light coupling lens 20 and a plurality of light receiving elements 30.

The light emitting elements 10 are arranged on a circuit board 11 in line and emit light signals. The light coupling lens 20 receives the light signals emitted from the light emitting elements 10 and adjusts the transmit direction of the light signals. The light coupling lens 20 includes a light input surface 21, a light output surface 22 adjacent to the light input surface 21 and a plurality of total reflective surfaces connected to the light input surface 21 and the light output surface 22. In the present embodiment, the light coupling lens 20 includes a first total reflective surface 231 connected to the light output surface 22, a second total reflective surface 232 connected to the light input surface 21, and a third total reflective surface 233 connected to the first total reflective surface 231 and the second total reflective surface 232.

In the present embodiment, the light input surface 21 is perpendicular to the direction of the light signals emitted from the light emitting elements 10. The light input surface 21 includes a plurality of first aspheric protrusions 211 respectively facing the plurality of light emitting elements 10. The light output surface 22 includes a plurality of second aspheric protrusions 221 respectively facing the plurality of light receiving elements 30. In the present embodiment, the first aspheric protrusions 211 are arranged in line, and the second aspheric protrusions 221 are arranged in line. The light input surface 21 is perpendicular to the light output surface 22.

The first total reflective surface 231 and the light output surface 22 cooperatively define a first obtuse angle, in the present embodiment, the first obtuse angle is 135 degrees. The second total reflective surface 232 and the light input surface 21 cooperatively define a second obtuse angle, in the present embodiment, the second obtuse angle is 135 degrees. The third total reflective surface 233 is perpendicular to the first total reflective surface 231 and the second total reflective surface 232.

In the present embodiment, the optical device 100 further includes two fixing boards 40 for fixing the circuit board 11 and the light coupling lens 20. The circuit board 11 and the light coupling lens 20 are sandwiched between the fixing boards 40. The two fixing boards 40 are parallel to each other, and the light input surface 21, the light output surface 22, the first total reflective surface 231, the second total reflective surface 232 and the third total reflective surface 233 are perpendicular to the two fixing boards 40.

Light signals emitted from the light emitting elements 10 enter the light coupling lens 20 in a manner that the light signals are respectively collimated by the first aspheric protrusions 211 to be parallel light signals. The parallel light signals are reflected by the first total reflective surface 231, the second total reflective surface 232, and the third total reflective surface 233 in turn, and then respectively collimated by the second aspheric protrusions 221 to be convergent light signals. The convergent light signals respectively transmit into the light receiving elements 30. Thus, the direction of the light signals is changed. In other words, the light receiving elements 30 are not required to front the light emitting elements 10 in help of the light coupling lens 20.

In an alternative embodiment, the number of the light emitting elements 10 and the light receiving elements 30 can be less or more, and the number of the first aspheric protrusions 211 and the second aspheric protrusions 221 can be changed according to that of the light emitting elements 10 and the light receiving elements 30. Furthermore, the internal angles between the light input surface 21, the light output surface 22 and the plurality of total reflective surfaces can be changed according to demand; therefore, the light signals emitted from the light emitting elements 10 can be changed to a desired direction.

It is to be further understood that even though numerous characteristics and advantages have been set forth in the foregoing description of embodiments, together with details of the structures and functions of the embodiments, the disclosure is illustrative only; and that changes may be made in detail, especially in matters of shape, size, and arrangement of parts within the principles of the disclosure to the full extent indicated by the broad general meaning of the terms in which the appended claims are expressed.

What is claimed is:

1. An optical device comprising:
a light emitting element emitting light signal;
a light coupling lens receiving the light signal emitted from the light emitting element, the light coupling lens comprising a light input surface, a light output surface adjacent to the light input surface and a plurality of total reflective surfaces connected to the light input surface and the light output surface, the light input surface comprising a first aspheric protrusion facing the light emitting element, the light output surface comprising a second aspheric protrusion, light signal emitted from the light emitting element entering the light coupling lens and collimated by the first aspheric protrusion to be parallel light signal, the parallel light signal being reflected by the total reflective surfaces and then collimated by the second aspheric protrusion to be convergent light signal; and a light receiving element facing the second aspheric protrusion, the light receiving element receiving the convergent light signal;

wherein the light coupling lens comprises a first total reflective surface connected to the light output surface, a second total reflective surface connected to the light input surface, and a third total reflective surface connected to and perpendicular to the first total reflective surface and the second total reflective surface.

2. The optical device of claim 1, wherein the light input surface is perpendicular to a direction of the light signal emitted from the light emitting element.

3. The optical device of claim 1, wherein the light input surface is perpendicular to the light output surface.

4. The optical device of claim 1, wherein the third total reflective surface is perpendicular to the first total reflective surface and the second total reflective surface.

5. The optical device of claim 1, wherein the first total reflective surface and the light output surface cooperatively define a first obtuse angle.

6. The optical device of claim 5, wherein the first obtuse angle is 135 degrees.

7. The optical device of claim 1, wherein the second total reflective surface and the light input surface cooperatively define a second obtuse angle.

8. The optical device of claim 7, wherein the second obtuse angle is 135 degrees.

9. An optical device comprising:

a plurality of light emitting elements emitting light signals;

a light coupling lens receiving the light signals emitted from the light emitting elements, the light coupling lens comprising a light input surface, a light output surface adjacent to the light input surface and a plurality of total reflective surfaces connected to the light input surface and the light output surface, the light input surface comprising a plurality of first aspheric protrusions respectively facing the light emitting elements, the light output surface comprising a plurality of second aspheric protrusions, light signals emitted from the light emitting elements entering the light coupling lens and collimated by the first aspheric protrusions to be parallel light signals, the parallel light signals being reflected by the total reflective surfaces and then collimated by the second aspheric protrusions to be convergent light signals; and a plurality of light receiving elements respectively facing the second aspheric protrusions, the light receiving elements receiving the corresponding convergent light signals;

wherein the light coupling lens comprises a first total reflective surface connected to the light output surface, a second total reflective surface connected to the light input surface, and a third total reflective surface connected to and perpendicular to the first total reflective surface and the second total reflective surface.

10. The optical device of claim 9, wherein the light input surface is perpendicular to a direction of the light signal emitted from the light emitting element.

11. The optical device of claim 9, wherein the light input surface is perpendicular to the light output surface.

12. The optical device of claim 9, wherein the third total reflective surface is perpendicular to the first total reflective surface and the second total reflective surface.

* * * * *